United States Patent [19]
Walsh

[11] 3,787,141
[45] Jan. 22, 1974

[54] FILAMENT REINFORCED MOTOR ASSEMBLY

[75] Inventor: Thomas C. Walsh, New Britain, Conn.

[73] Assignee: United Aircraft Corporation, East Hartford, Conn.

[22] Filed: Nov. 30, 1972

[21] Appl. No.: 310,759

[52] U.S. Cl. .............................. 416/244, 416/230
[51] Int. Cl. .............................................. F01d 5/30
[58] Field of Search ........ 416/214, 218, 244, 244 A

[56] References Cited
UNITED STATES PATENTS

| | | | |
|---|---|---|---|
| 3,501,090 | 3/1970 | Stoffer et al. | 416/218 UX |
| 3,519,368 | 7/1970 | Howald | 416/244 X |
| 3,610,772 | 10/1971 | Wagle | 416/244 X |
| 3,632,460 | 1/1972 | Palfreyman | 416/230 X |

Primary Examiner—Everette A. Powell, Jr.
Attorney, Agent, or Firm—Stephen E. Revis

[57] ABSTRACT

A radially outwardly facing annular surface of a non-composite rotatable member, such as a rotor disc, includes a plurality of lobes extending radially outwardly from the surface. A filament reinforced composite annular ring surrounds the surface and is disposed on the lobes which serve to position it with respect to the rotatable member. The ring is spaced from the surface between adjacent lobes when the member is not rotating. The member is thus able to expand radially more rapidly than the composite ring which will deform as the member grows to reduce the space between it and the member until they are in contact or until the ring is taut whereupon the ring begins to carry the centrifugal loads of the rotating member.

4 Claims, 2 Drawing Figures

PATENTED JAN 22 1974  3,787,141

FILAMENT REINFORCED MOTOR ASSEMBLY

BACKGROUND OF THE INVENTION

1. Field of the Invention

This invention relates to the use of circumferentially wound filaments to reinforce a rotor assembly.

2. Description of the Prior Art

The use of circumferentially wound filaments to reinforce a rotor assembly is well known in the prior art as evidenced by U. S. Pat. No. 3,393,436 to Blackhurst, et al., and British Patent No. 1,252,544 to Herbstritt, issued Apr. 9, 1970. The chief advantage of these filaments is their high tensile strength and light weight; when these filaments are circumferentially wound about a rotatable body, their high tensile strength translates into a high hoop strength giving the filaments the ability to carry large centrifugal loads. A basic problem encountered with the use of circumferentially wound filaments for carrying centrifugal loads is the difference in thermal and centrifugal expansion rates between the filaments and noncomposite materials which they surround. Herbstritt, supra, for example, places resilient means between a ring of wound filaments and a non-composite rotatable member about which the ring is positioned; the resilient means enables the rotatable member to expand to some degree relative to the reinforcing filament wound ring, whereupon the ring eventually comes into centrifugal load bearing relationship to the rotatable member.

SUMMARY OF THE INVENTION

The present invention includes a rotatable member surrounded by a filament reinforced composite annular ring, wherein the rotatable member includes a plurality of radially extending lobes around its perimeter, and the ring is disposed on the lobes and is spaced from the surface of the rotatable member between adjacent lobes. During operation the noncomposite rotatable member expands faster than the ring. Because the ring and the rotatable member are spaced apart between adjacent lobes and because the ring is somewhat flexible, the difference in the amount of growth between the ring and the rotatable member is taken by a change in shape of the ring as the rotatable member expands against it. When the ring becomes taut between lobes, it will begin to carry the centrifugal loads.

A preferred embodiment of this invention is in a rotor assembly, such as for a gas turbine engine. Because balancing is so critical in a rotor assembly, the lobes would have to be so spaced and so sized so as not to cause unbalance to the rotor. Thus, the lobes could be of exactly the same shape and size and would be equally spaced about the perimeter of the surface about which the composite ring is positioned.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
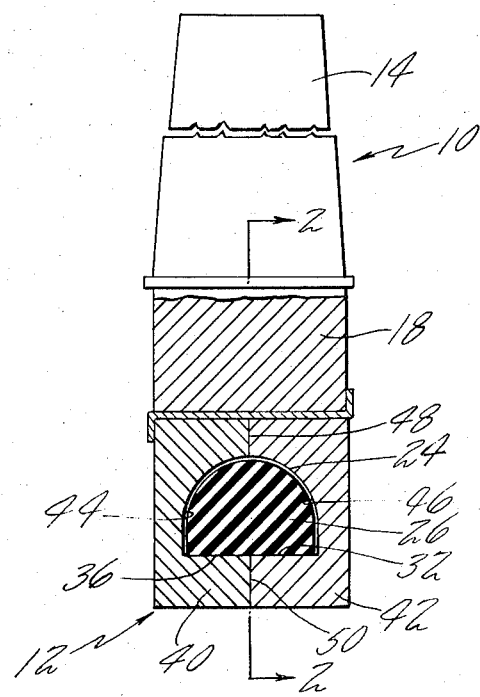
FIG. 1 is a sectional view of a portion of a turbine rotor assembly taken along the line 1—1 of FIG. 2.

As an example of a rotor assembly embodying the features of the present invention, consider the turbine rotor assembly shown in FIG. 1 and generally represented by the numeral 10. The turbine rotor assembly 10 is suitably mounted within the turbine section (not shown) of the gas turbine engine by means (not shown) well known to one skilled in the art. Additionally, it should be obvious to one skilled in the art that this invention is useful in a compressor rotor assembly, or for that matter this invention is useful for any rotatable member subjected to any combination of high temperatures and high centrifugal loads, such that there is significant radial expansion of the member.

Figure 2:
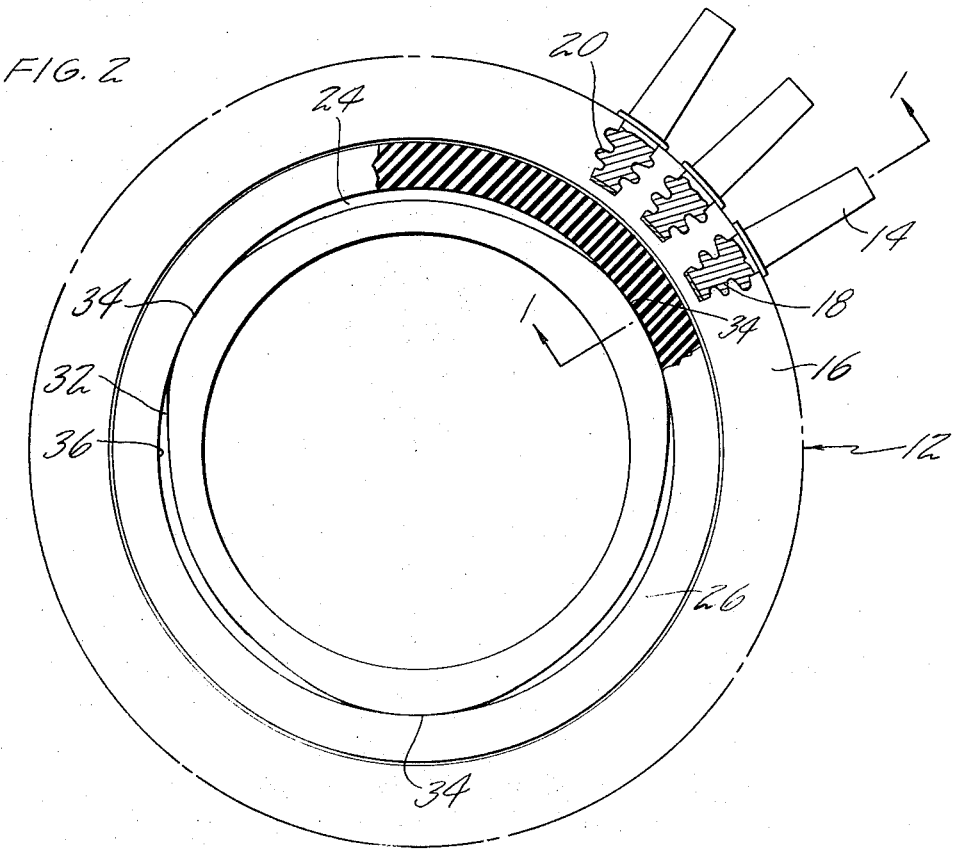
FIG. 2 is a sectional view taken along the line 2—2 of FIG. 1.

Referring now to FIGS. 1 and 2, the rotor assembly 10 comprises a rotatable member or disc 12 and a plurality of radially extending circumferentially spaced blades 14 attached by suitable means to the periphery 16 of the disc 12 such as by the use of a fir tree route 18 and corresponding fir tree slots 20, well known in the art.

As shown in FIG. 1 the disc 12 comprises left and right annular portions 40, 42 respectively. Each of said annular portions 40, 42 has an annular groove 44, 46, respectively. The annular portions 40, 42 are joined together by suitable means such as diffusion bonding at 48 and 50. The grooves 44, 46 cooperate to form an annular cavity 24. Positioned within the annular cavity 24 is an annular filament reinforced composite ring 26. The composite ring 26 comprises one or more circumferentially wound filaments embedded in a matrix material; in this embodiment it is contemplated that the filaments be made from carbon and that the matrix material be made from carbon. The filaments and matrix materials are a matter of choice and depend on several factors such as maximum strength requirements, maximum temperature requirements, and filament/matrix thermal and stiffness compatibility. Examples of other possible filament-matrix combinations are sapphire-nickel, boron-titanium, and graphite-graphite; the present invention, however, is not limited to any particular filament-matrix combination. By positioning the ring 26 within the cavity 24, the filaments and matrix material are protected from direct contact from contaminants which may surround the rotor assembly and which may have a corrosive effect on either the filament material or the matrix material. It is not mandatory, however, that the ring 26 be positioned within a cavity. This would not be necessary if the surrounding environment were not harmful to the filament and matrix materials. In any event, the ring 26 could be encapsulated by a thin sheath of suitable material to protect it from contaminants.

The annular cavity 24 has a radially outwardly facing annular surface 32 which includes a plurality of circumferentially spaced lobes 34. In this exemplary embodiment there are three lobes 34 of similar size and shape, equally spaced about the annular surface 32 such that the disc 12 is balanced. The ring 26 has a radially inwardly facing annular surface 36 disposed on the lobes 34; as in shown in FIG. 2, the ring 26 is spaced from the annular surface 32 of the disc 12 between adjacent lobes. One function of the lobes is to hold the composite ring concentrically with respect to the disc.

In this example the disc 12 is a nickel base alloy such as AMS 1007. As with most noncomposite materials, its centrifugal and thermal growth rates are greater than the composite ring 26; and thus during rotor operation the lobes 34 move radially outwardly against the annular surface 36 of the ring 26. Since the ring 26 is relatively flexible, it will distort until the annular surfaces 32 and 36 are substantially flush or until the ring 26 becomes taut between points of contact on the annular surface 32 of the disc 12. At this point the ring 26 begins to carry the centrifugal loads imposed upon the disc 12.

Because forces on the ring 26 which are concentrated in a relatively small area may damage filaments within the ring, it is preferable to distribute loads evenly over the entire annular surface 36. It is therefore desirable to have lobes 34 with relatively large radii of curvature that blend smoothly with the remaining circumferential portions of the annular surface 32. It should be apparent to one skilled in the art how to shape and space the lobes 34 to assure flush contact between the annular surfaces 32 and 36 at all locations about the periphery of the respective surfaces at operational rotor speeds and temperatures. Although in this preferred embodiment three lobes are shown, the actual number of lobes used and their locations about the periphery are a matter of choice based upon sound engineering judgement in view of considerations hereinbefore mentioned.

Although the invention has been shown and described with respect to a preferred embodiment thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A rotor assembly comprising:
    a noncomposite rotatable member having an axis and a radially outwardly facing annular surface, said surface forming a plurality of circumferentially spaced, radially outwardly extending lobes; and
    a filament reinforced composite annular ring having a radially inwardly facing annular surface in facing relationship to said outwardly facing annular surface and disposed on said lobes for positioning said ring with respect to said member, said inwardly facing annular surface being spaced from said outwardly facing annular surface between adjacent lobes and adapted to come into centrifugal load bearing relationship to said outwardly facing annular surface at rotor assembly operational speeds and temperatures due to the different centrifugal and thermal growth rates of said rotatable member and said composite annular ring.

2. The rotor assembly according to claim 1 wherein said lobes are the same size and shape and are spaced equally around said outwardly facing annular surface for providing balance to said rotatable member and for positioning said annular ring concentrically with respect to said axis.

3. The rotor assembly according to claim 2 wherein said lobes blend smoothly with the remaining portions of said outwardly facing annular surface and wherein said inwardly facing annular surface is adapted to come into flush relationship with said outwardly facing annular surface around the entire circumference thereof at rotor assembly operational speeds and temperatures.

4. A rotor assembly for a gas turbine engine comprising:
    a noncomposite disc having an axis and including an annular cavity therein concentric with said axis, said cavity including a radially outwardly facing annular surface, said surface forming a plurality of radially outwardly extending lobes of similar size and shape equally spaced about the circumference of said outwardly facing annular surface, said lobes blending smoothly with the remaining portions of said outwardly facing annular surface, said disc also including blade attaching means adapted to carry a plurality of rotor blades; and
    a filament wound composite annular ring having a radially inwardly facing annular surface in facing relationship to said outwardly facing annular surface and disposed on said lobes and concentrically positioned with respect to said axis, said inwardly facing annular surface being spaced from said outwardly facing annular surface between adjacent lobes when the rotor assembly is at rest and being adapted to come into substantially flush contact around the entire circumference of said outwardly facing annular surface at rotor assembly operational speeds and temperatures due to the different centrifugal and thermal growth rate of said disc and said composite annular ring.

* * * * *

UNITED STATES PATENT OFFICE
CERTIFICATE OF CORRECTION

Patent No. 3,787,141    Dated January 22, 1974

Inventor(s) THOMAS C. WALSH

It is certified that error appears in the above-identified patent and that said Letters Patent are hereby corrected as shown below:

On the cover sheet [54], "FILAMENT REINFORCED MOTOR ASSEMBLY" should read -- FILAMENT REINFORCED ROTOR ASSEMBLY -- .

Signed and sealed this 6th day of August 1974.

(SEAL)
Attest:

McCOY M. GIBSON, JR.
Attesting Officer

C. MARSHALL DANN
Commissioner of Patents